(12) United States Patent
DeBey (10) Patent No.: US 10,329,015 B2
(45) Date of Patent: Jun. 25, 2019

(54) AIRCRAFT LIFT AND PROPULSION FROM DISPARATE AIR FLOWS

(76) Inventor: Henry C. DeBey, Greeley, CO (US)

(*) Notice: Subject to any disclaimer, the term of this patent is extended or adjusted under 35 U.S.C. 154(b) by 0 days.

(21) Appl. No.: 14/116,853

(22) PCT Filed: May 18, 2012

(86) PCT No.: PCT/US2012/038638
§ 371 (c)(1),
(2), (4) Date: Nov. 11, 2013

(87) PCT Pub. No.: WO2012/159056
PCT Pub. Date: Nov. 22, 2012

(65) Prior Publication Data
US 2014/0097301 A1 Apr. 10, 2014

Related U.S. Application Data

(60) Provisional application No. 61/487,291, filed on May 18, 2011.

(51) Int. Cl.
*B64C 31/00* (2006.01)
*B64C 37/02* (2006.01)
*B64D 3/00* (2006.01)

(52) U.S. Cl.
CPC .............. *B64C 31/00* (2013.01); *B64C 37/02* (2013.01); *B64D 3/00* (2013.01)

(58) Field of Classification Search
CPC ....................................................... B64C 37/00
USPC ......................................................... 244/2, 3
See application file for complete search history.

(56) References Cited

U.S. PATENT DOCUMENTS

| 1,181,784 A | * | 5/1916 | McCurry | B64C 27/82 244/17.19 |
| 2,373,086 A | * | 4/1945 | Alabrune | B64D 1/02 244/137.1 |
| 2,721,044 A | * | 10/1955 | Young | B64C 37/02 244/2 |
| 2,730,398 A | * | 1/1956 | Huested | B64D 1/22 244/118.5 |
| 4,416,436 A | * | 11/1983 | Wilson, Jr. | B64D 1/22 244/137.1 |
| 5,722,618 A | * | 3/1998 | Jacobs | B64D 1/00 244/137.1 |
| 6,254,034 B1 | | 7/2001 | Carpenter | |

(Continued)

FOREIGN PATENT DOCUMENTS

CA 2 296 935 7/2001

OTHER PUBLICATIONS

U.S. Appl. No. 61/487,291, filed May 18, 2011.
PCT Interarntional Patent Application No. PCT/US2012/038638, filed May 18, 2012.

*Primary Examiner* — Brian M O'Hara
*Assistant Examiner* — Keith L Dixon
(74) *Attorney, Agent, or Firm* — Craig R. Miles; CR Miles P.C.

(57) ABSTRACT

Generally, an inventive aircraft (1) having at least a first lift body (2) and a second lift body (3) each controllably configurable to correspondingly generate an amount of lift (4) sufficient to remain aloft at a first elevation (5) and a second elevation (6) a sufficient distance apart (7) to subject the first lift body (2) and the second lift body (3) to sufficiently disparate fluid flow characteristics (8) to propel the aircraft (1).

11 Claims, 9 Drawing Sheets

(56) References Cited

U.S. PATENT DOCUMENTS

| | | | | |
|---|---|---|---|---|
| 8,078,395 B2* | 12/2011 | Builta | .................. | G05D 1/0202 |
| | | | | 244/1 R |
| 8,226,043 B2* | 7/2012 | Reinhard | ............. | B64D 17/025 |
| | | | | 244/138 R |
| 8,308,142 B1* | 11/2012 | Olson | .................... | B64C 37/02 |
| | | | | 244/137.1 |
| 8,366,037 B2* | 2/2013 | Morris | .................... | B65D 3/00 |
| | | | | 244/1 TD |
| 2002/0190162 A1 | 12/2002 | McDonnell | | |
| 2007/0120004 A1 | 5/2007 | Olson | | |
| 2010/0230546 A1 | 9/2010 | Bevirt et al. | | |

\* cited by examiner

FIG. 9

AIRCRAFT LIFT AND PROPULSION FROM DISPARATE AIR FLOWS

This application is the United States National Stage of International Patent Cooperation Treaty Patent Application No. PCT/US2012/038638, filed May 18, 2012, which claims the benefit of U.S. Provisional Patent Application No. 61/487,291, filed May 18, 2011, each hereby incorporated by reference herein.

I. TECHNICAL FIELD

Generally, an inventive aircraft having at least a first lift body and a second lift body each controllably configurable to correspondingly generate lift sufficient to remain aloft at a first elevation and a second elevation a sufficient distance apart to subject the first lift body and the second lift body to sufficiently disparate fluid flow characteristics to propel the aircraft.

II. BACKGROUND

Conventional wind powered aircraft and methods for wind powered flight use a low-speed, high-drag leading aircraft tethered to a low-speed, low-drag trailing aircraft. The low-speed, high-drag leading aircraft remains aloft under a force of lift provided by a high altitude wind acting against the leading aircraft in a flying direction. The low-speed, low-drag trailing aircraft such as a glider is towed at a lower altitude having a lesser wind speed as described in Canadian Patent Application No. 2,296,935.

One of the disadvantages of conventional wind powered aircraft using a low-speed, high-drag leading aircraft tethered to a low-speed, low-drag trailing aircraft can be that the difference in wind speed between the leading aircraft and the trailing aircraft must be as much as 60 miles per hour to remain aloft. Accordingly, aircraft of this configuration cannot operate using winds having lesser differentials which might occur throughout a period of time or occur intermittently during a period of time or occur throughout or intermittently in the flight path of the aircraft. There would be an advantage in a wind powered aircraft which remains aloft even when there are small differences in wind speed between a first altitude and a second altitude or even small differences in wind speed at the same altitude.

An additional disadvantage of conventional wind powered aircraft using a low-speed, high-drag leading aircraft tethered to a low-speed, low-drag trailing aircraft can be that the flying speed of the trailing aircraft to remain aloft must be as much as 40 miles per hour and if the tail wind is 30 miles per hour the trailing aircraft must maintain a ground speed of at least 70 miles per hour. Accordingly, aircraft of this configuration cannot operate using lesser flying speeds which might occur intermittently during a period of time or occur throughout or intermittently in the flight path of the aircraft. There would be an advantage in a wind powered aircraft which remains aloft even when the flying speed is substantially lower than 40 miles per hour or the ground speed is substantially lower than 70 miles per hour.

Another disadvantage of conventional wind powered aircraft using a low-speed, high-drag leading aircraft tethered to a low-speed, low-drag trailing aircraft can be that the vertical separation to achieve sufficient difference in the wind speed to operate requires the use of a correspondingly lengthy tether between the leading aircraft and the trailing air craft. The longer the tether the greater the strength required and the greater the weight to overcome during flight. Additionally, all the components to pay out and take up the tether will be correspondingly larger and have greater weight.

Another disadvantage of conventional wind powered aircraft using a low-speed, high-drag leading aircraft tethered to a low-speed, low-drag trailing aircraft can be substantial wind resistance of the leading aircraft and the trailing aircraft. As an example, an aircraft operating in a wind differential of 60 mph will have wind resistance on the order of 16 times greater than an aircraft operating in a wind differential of 15 mph. Consequently, aircraft operating at a wind differential of 60 must include components having greater strength and greater weight. Also, the strain on components at greater wind differentials can be greater than at lower wind differentials which may lead to shorter life span and higher maintenance of the components and the aircraft.

The instant inventive aircraft affords wind powered flight in a manner which addresses the above-identified disadvantages of conventional wind powered aircraft.

III. DISCLOSURE OF INVENTION

Accordingly, a broad object of the invention can be to provide a wind powered aircraft having a first lift body and a second lift body each lift body controllably configurable to adjust lift and drag which allows the first lift body to have a greater or lesser amount of lift or a greater or lesser amount of drag in relation each other. As such, there is no limitation on the inventive aircraft that the leading lift body be a low-speed, high-drag aircraft or that the trailing lift body be a low-speed, low-drag lift body or that the leading aircraft tow the trailing aircraft.

Another broad object of the invention can be to provide a wind powered aircraft having a first lift body and a second lift body each lift body controllably configurable to adjust lift and drag which allows the inventive aircraft to remain aloft in winds acting on the first lift body and the second lift body having a difference of as little as 10 miles per hour.

Another broad object of the invention can be to provide a wind powered aircraft having a first lift body and a second lift body each lift body controllably configurable to adjust the lift, the drag, and direction of flight which allows the inventive aircraft to remain aloft without any movement or at very little flying speed relative to the ground.

Another broad object of the invention can be to provide a wind powered aircraft having a first lift body and a second lift body independently coupled by corresponding first and second connective members to a payload container. The payload container can be structurally discrete from the first lift body and the second lift body but responsive to the combined lift, drag and velocity of the first lift body and the second lift body.

Another broad object of the invention can be to provide a wind powered aircraft having a first lift body coupled by connective member to a second lift body with both of the first lift body and the second lift body controllably configurable to remain aloft without the second lift body being towed by the first lift body.

Naturally, further objects of the invention are disclosed throughout other areas of the specification and drawings.

V. MODE(S) FOR CARRYING OUT THE INVENTION

Generally, an inventive aircraft (1) having at least a first lift body (2) and a second lift body (3) each controllably configurable to correspondingly generate a lift (4) sufficient to remain aloft at a first elevation (5) and a second elevation (6) a sufficient distance apart (7) to subject the first lift body (2) and the second lift body (3) to sufficiently disparate fluid flow characteristics (8) to propel the aircraft (1).

Figure 1:
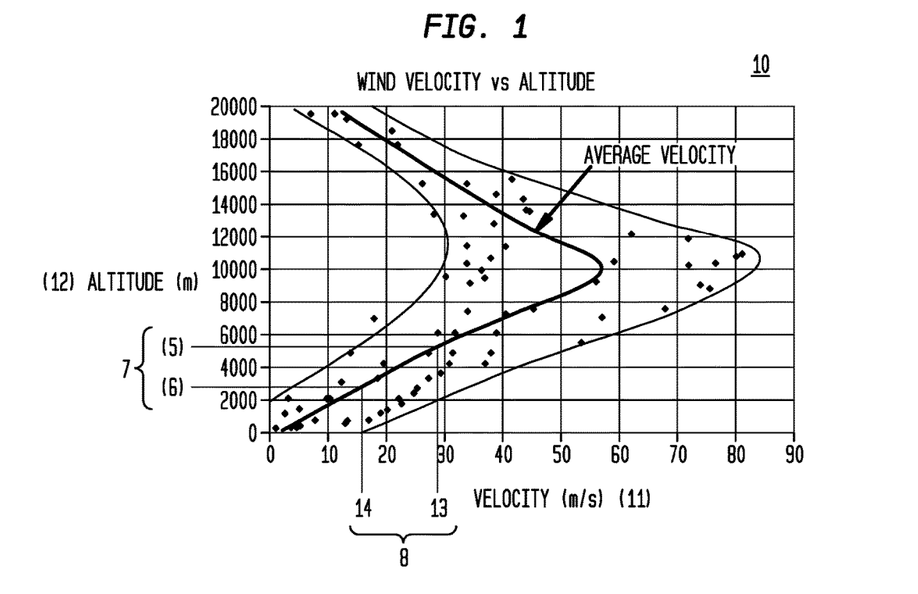
FIG. 1 is a plot of wind velocity against altitude.

Now referring primarily to FIG. 1, which provides an example of disparate fluid flow characteristics (8) at a first elevation (5) and at a second elevation (6) in the form of a plot (10) of wind speed in meters per second (11) against altitude in meters (12). On average, wind speed (11) increases at a rate of about four miles per hour (1.79 meters per second) for every additional 1,000 feet (about 304.8 meters) of altitude (12). Specifically, a first elevation (5) and a second elevation (6) having an altitude difference of 7,000 feet (2133.6 meters) can provide a first air flow (13) and a second air flow (14) having a difference in wind speed (11) of about 28 mph (12.52 meters per second).

Figure 2:
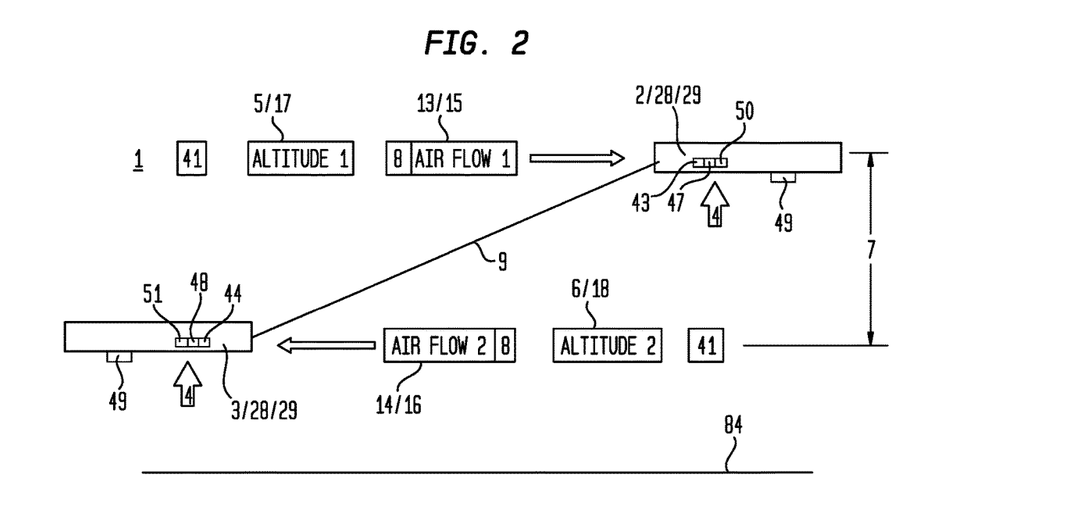
FIG. 2 is a schematic diagram of a particular embodiment of the inventive aircraft.

Now referring primarily to FIG. 2, a first lift body (2) can be coupled by a connective member (9) to a second lift body (3). As to particular embodiments, the first lift body (2) and the second lift body (3) can be unpowered, powered, or intermittently powered first and second lift bodies (2)(3).

The term "lift body" for the purposes of this invention broadly encompasses any object having an external surface having a configuration which can be controlled (also referred to as "controllably configured") to generate lift sufficient to remain aloft at an elevation (also referred to as "an altitude" depending on the embodiment of the invention) in a fluid flow (also referred to as "an air flow" depending on the embodiment of the invention), and as to particular embodiments, can be further controllably configured to generate drag or controllably configured to alter pitch, roll, yaw, or combinations thereof, and without limitation to the forgoing general definition, particular examples of a lift body can include: rigid wings, rigid-wing aircraft, aerodynes, kites, flexible-wings, flexible aircraft, parafoils, parachutes, inflatable wings, inflatable aircraft, tensairity wings, tensairity aircraft, rotary-wing aircraft, helicopters, or the like.

The term "connective member" for the purposes of this invention broadly encompasses any manner of line, strand, member, cord, or the like which can be paid out in sufficient length to allow one or more lift bodies coupled thereto to remain aloft at an elevation or disparate elevations, and without limitation to the forgoing general definition, particular examples of a connective member can include: tether, rope, line, wire rope, hawser, cordage, strand, string, cable, stranded wire cable, solid wire, stranded fabric cable, solid fabric, stranded synthetic fiber cable, solid synthetic fiber, rod, metal rod, composite rod, wooden rod, plastic rod, pole, metal pole, composite pole, wooden pole, plastic pole, shaft, metal shaft, composite shaft, wooden shaft, plastic shaft, pipe, metal pipe, composite pipe, wooden pipe, plastic pipe.

Again referring primarily to FIG. 2, the first lift body (2) can be controllably configured to generate an amount of lift (4) sufficient to remain aloft at a first elevation (5) (which can be a first altitude (17) depending upon the embodiment) and a second lift body (3) controllably configured to generate an amount of lift (4) sufficient to remain aloft at a second elevation (6) (which can be a second altitude (18) depending upon the embodiment). The first elevation (5) and the second elevation (6) can be a sufficient distance apart (7) to subject the first lift body (2) to a first fluid flow (15) (which can be a first air flow (13) depending on the embodiment) and the second lift body (3) to a second fluid flow (16) (which can be a second air flow (14) depending on the embodiment). The first fluid flow (15) and the second fluid flow (16) can have disparate fluid flow characteristics (8). While the example of FIG. 2 depicts the first lift body (2) and the second lift body (3) each as unpowered fixed wing aircraft aloft at a first altitude (17) and a second altitude (18) correspondingly subjected to a first airflow (13) and a second air flow (14), this example and other exemplary embodiments of the invention described herein are intended to provide a description sufficient for a person of ordinary skill in the art to make and the use numerous and varied embodiments of the inventive aircraft (1).

The term "fluid flow" for the purposes of this invention broadly encompasses any movement of any flowable material including but not limited to one or more solids, one or more gases, one or more liquids, or combinations or mixtures of one or more solids, one or more gases and one or more liquids, in various combinations and permutations, each regardless of temperature, pressure, manner of combination or mixture, or the like.

Figure 3:
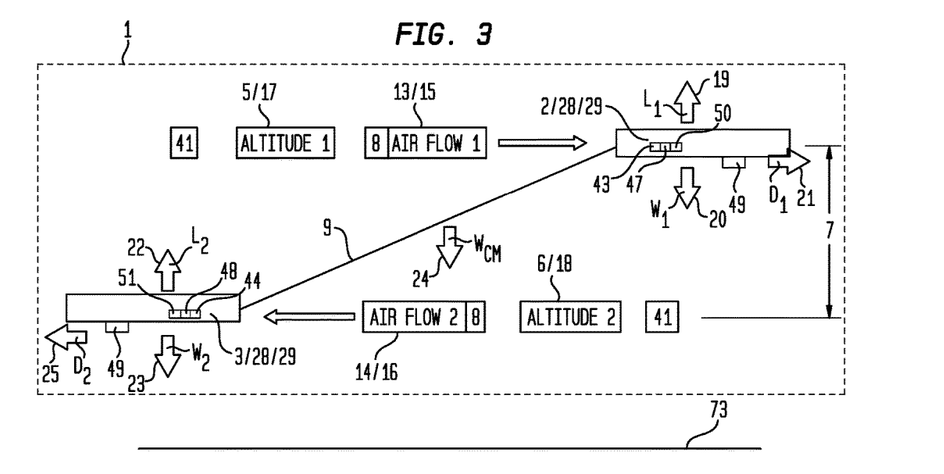
FIG. 3 is a schematic diagram of the forces acting on the particular embodiment of the inventive aircraft shown in FIG. 2.

Now referring primarily to FIG. 3, which illustrates the aerodynamic and gravitational forces associated with a first lift body (2) aloft at a first elevation (5) (or first altitude (17)) and a second lift body (2) aloft at a second elevation (6) (or second altitude (18)) at sufficient distance apart (7) to be subjected a first fluid flow (15) (a first air flow (13)) and a second fluid flow (16) (a second air flow (14)) having sufficiently disparate fluid flow characteristics (8) to propel the inventive aircraft (1). The term "propel" for the purposes of this invention means any movement of the aircraft in any direction or speed and without limitation to the forgoing general definition, includes any movement whether vertical or horizontal in any direction or at any speed or combinations thereof.

In this regard, a first lift body (2) can be controllably configured to be subjected to an amount of lift $(L_1)$ (19) which can offset an amount of weight $(W_1)$ (20) of the first lift body (2) and an amount of drag $(D_1)$ (21). Similarly, a second lift body (3) can be controllably configured to be subjected to an amount of lift ($L_2$) (22) which can offset the amount of weight ($W_2$) (23) of the second lift body (3) plus an amount of weight of the connective member ($W_{cm}$) (24) and an amount drag ($D_2$) (25).

The term "disparate fluid flow characteristics" for the purposes of this invention broadly encompasses any difference in one or more of speed, direction, magnitude, or the like of a first fluid flow in relation to a second fluid flow and while disparate fluid flow characteristics can occur in fluid flows vertically separated as shown in the examples of FIGS. 2-3; disparate fluid flow characteristics of fluid flows that are laterally separated at the same elevation (altitudes) are encompassed by this term.

Figure 4:
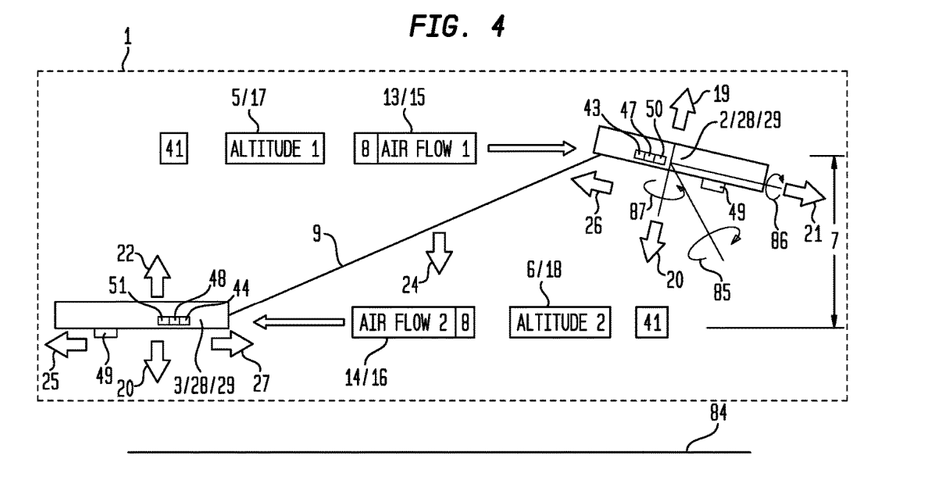
FIG. 4 is a schematic diagram of controllably configuring the particular embodiment of the inventive aircraft shown in FIG. 2 to alter the forces shown in FIG. 3 to allow wind powered flight along a predetermined travel path.

Now referring primarily to FIG. 4, which illustrates a first lift body (2) aloft at a first elevation (5) (a first altitude (17)) subject to a first fluid flow (15) (a first air flow (13)) and a second lift body (3) aloft at a second elevation (6) (a second altitude (18)) subject to a second fluid flow (16) (a second air flow (14)) can be subjected to a first fluid flow (15) and a second fluid flow (16) (a first and second air flows (13)(14)) sufficiently disparate to propel the inventive aircraft (1).

As to particular embodiments, the first lift body (2) and the second lift body (3) can be each be controllably configurable to independently adjust one or more of pitch (85), roll (86) or yaw (87) (as shown for the first lift body (2)) to correspondingly alter the amount of lift ($L_1$)(19) and ($L_2$) (22), the amount drag ($D_1$) (21) and ($D_2$)(25), the amount of weight ($W_1$) (20) and ($W_2$)(23), the amount of thrust ($T_1$) (26) and ($T_2$)(27) contributed to each of the first lift body (2) or the second lift body (3) in whole or in part or to the aircraft (1) in whole or in part. By controllably configuring the first lift body (2) and the second lift body (3), one or more of the direction (28) or speed (29) of the inventive aircraft (1) can be controlled.

Figure 5A:
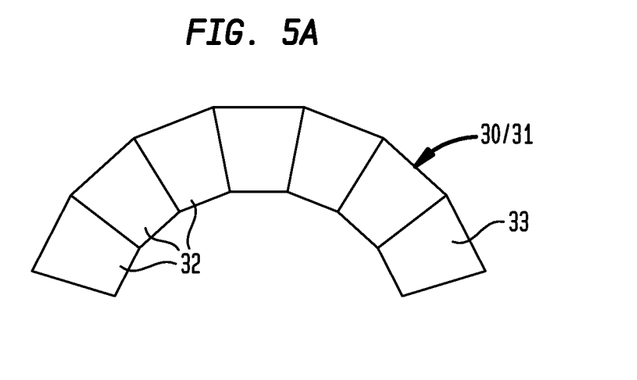
FIGS. 5A through 5C are front views of a particular embodiment of a lift body in the form of a parafoil which illustrate a particular method of controllably configuring the parafoil.
Figure 5B:
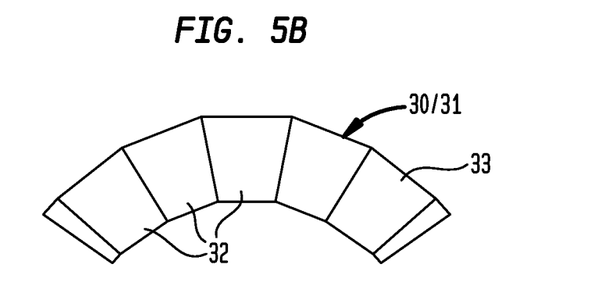
Figure 5C:
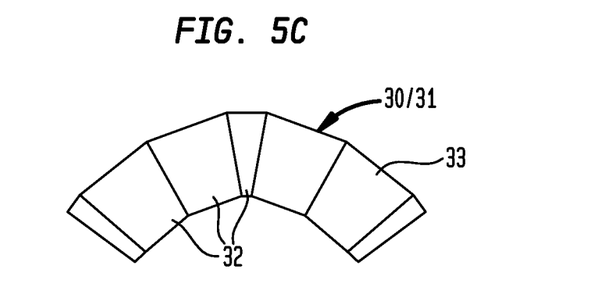
Figure 6A:
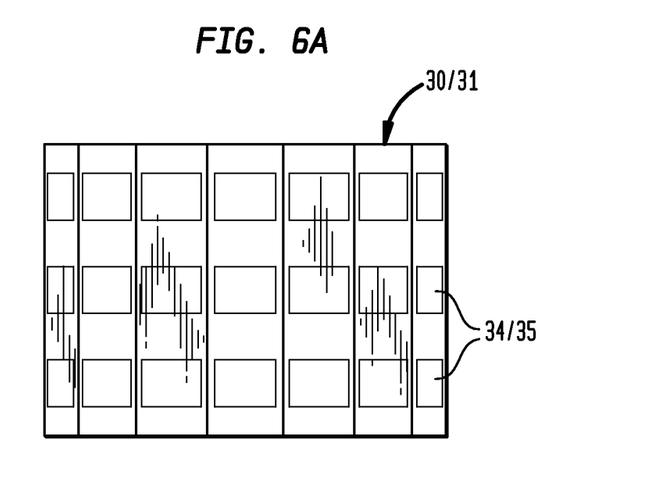
FIGS. 6A and 6B are top views of a particular embodiment of a lift body in the form of a parafoil which illustrate another particular method of controllably configuring a parafoil.
Figure 6B:
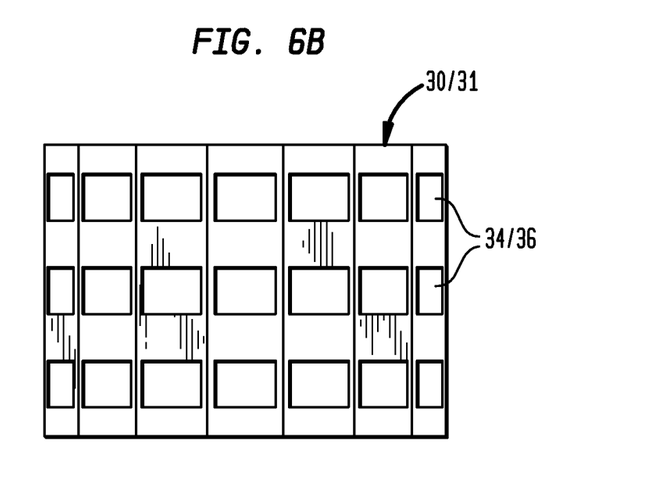

Now referring primarily to FIGS. 5A through 5C and FIGS. 6A through 6B, which show a particular embodiment of the first lift body (2) or the second lift body (3), or both, in the form of a first parafoil (30) and a second parafoil (31), having a plurality of nonrigid parafoil cells (32) which can be correspondingly inflated by the first fluid flow (15) (first airflow (13)) or the second fluid flow (16) (second air flow (16)). In the example of FIGS. 5A through 5C, the effective surface area (33) of a first or second parafoil (30)(31) can be controllably configured by fully or partially collapsing or opening one or more of the parafoil cells (32). As one or more parafoil cells (32) are collapsed (as shown in the example of FIGS. 5B and 5C) or opened (as shown in the example of 5A), the effective surface area (33) of the first or second parafoil (30)(31) can be increased or decreased. In the example of FIGS. 6A through 6B, the first lift body (2) or the second lift body (3) (in the form of a parafoil (30)(31)) can have a surface area (33) which includes a plurality of shutter elements (34) which can as to each one or collectively, whether in whole or in part, be disposed in the closed condition (35) (as shown in the example FIG. 6A) or can be disposed in the open condition (36) (as shown in the example of 6B).

Figure 8:
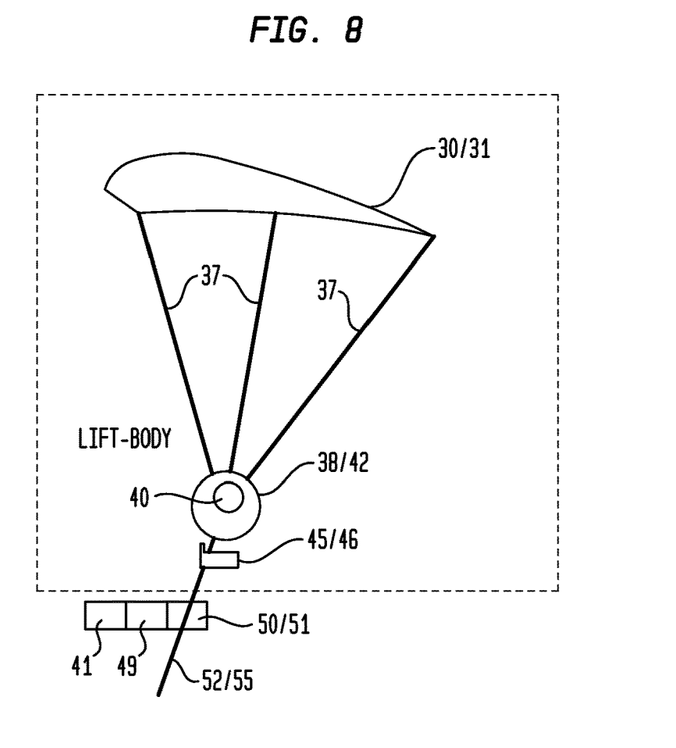
FIG. 8 illustrates a particular embodiment of a lift body controllably configurable in response to a lift body controller driven by an aircraft controller based on sensed lift body characteristics and fluid flow characteristics.

Now referring primarily to FIG. 8, particular embodiments of a first parafoil (30) and a second parafoil (31) suitable for use in particular embodiments of the inventive aircraft (1) are available from Pioneer Aerospace for NASA's National Aeronautics and Space Administration Crew Return Vehicle CRV, Model Number X-38. The first parafoil (30) and the second parafoil (31) can be constructed from material such as: nylon, ripstop nylon, silk, para-aramid synthetic fiber such as KEVLAR®, or the like. The shroud lines (37) of the first parafoil (30) and the second parafoil (31) can be constructed from a material such as: ultra-high-molecular-weight polyethylene fibers, polyethylene terephthalate such as DACRON®, or the like. As to a particular exemplary embodiment of the first parafoil (30) and the second parafoil (31) the span can be about 144 feet and the chord can be about 52 feet to provide a total surface area of approximately 7,500 square feet; however, this example of a first and second lift body (2)(3) in the form of a first parafoil (30) and a second parafoil (31) is intended to be illustrative of the numerous and varied lift bodies (2)(3) or parafoils (30)(31) that can be utilized in embodiments of the inventive aircraft (1).

As to particular embodiments, the shroud lines (37) of the first parafoil (30) can be coupled to a first parafoil controller (38) which controllably configures the first parafoil (30) to adjust one or more of: the amount of lift ($L_1$) (19), the amount of drag ($D_1$) (21), velocity ($V_1$)(39), or the like. The first parafoil controller (38) can include shroud actuator elements (40) which operate the shroud lines (37) to controllably configure the first parafoil (30) to fly in accordance with a planned trajectory, towards waypoints, or toward a first altitude (17) having a first air flow (13) having one or more first air flow characteristics (41) such as air flow speed, air flow direction, density, temperature, or the like, making corrections in flight as necessary via the shroud actuator elements (40) coupled to the first parafoil (30) shroud line(s) (37). An example of a first parafoil controller (38) suitable for use with embodiments of the invention can be a Sherpa Ranger Ultra-Light available from Mist Mobility Integrated Systems Technology, Inc. MMIST, Ottowa, Ontario, Canada.

Particular embodiments of the second parafoil (31) can include a similar parafoil configuration as above described and further include a second parafoil controller (42), as above described. As to other embodiments of a first lift body (2) and a second lift body (3) (as shown for example in FIG. 2), a first lift body controller (43) and a second lift body controller (44) can correspondingly include actuator elements which operate to controllably configure the lift body (2)(3) to provide directional or guidance control as would be understood by a person of ordinary skill in the art to alter the amount of lift, the amount of drag and the velocity of the first and second lift body (2)(3).

Again referring primarily to FIG. 8, particular embodiments of the first parafoil (30) and the second parafoil (31) can further correspondingly include a first parafoil sensor (45) and a second parafoil sensor (46) (as to other embodiments referred to generally as a first lift body sensor (47) and a second lift body sensor (48) as shown in the example of FIG. 2). The first and second parafoil sensors (43)(44) (or first and second lift body sensors (47)(48)) can be discrete from or be made as one-piece or as an assembly with the first and second parafoil controllers (38)(42). The first parafoil sensor (45) and the second parafoil sensor (46) can sense one or more fluid flow characteristics (41) relating to the first parafoil (30) and second parafoil (31) as well as lift body characteristics (49) relating to the first parafoil (30) and second parafoil (31) such as position, altitude, airspeed, heading, ground speed, course, ascent rate, descent rate, ascent trajectory and descent trajectory, or the like, all of which can be processed by one or more aircraft controller(s) (50)(51).

Figure 9:
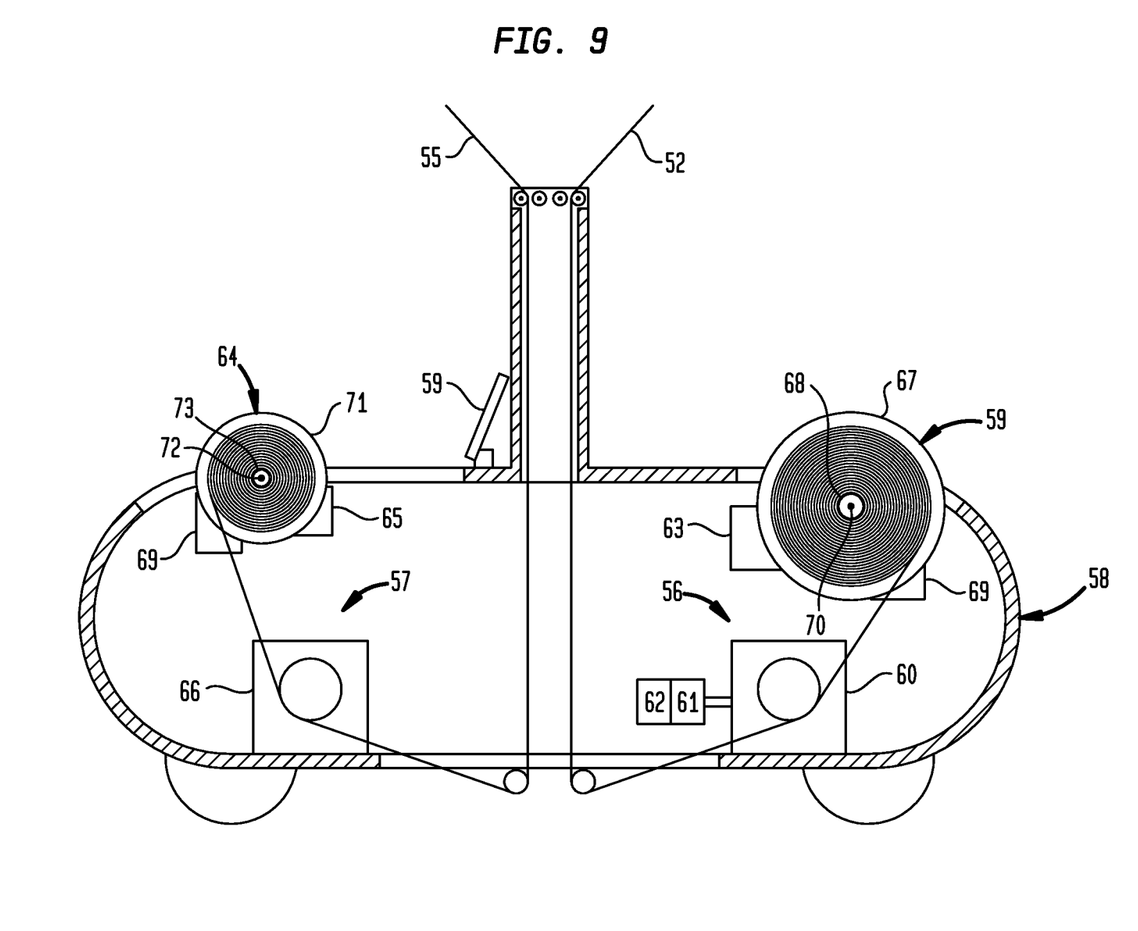
FIG. 9 is cross sectional illustration of a particular embodiment of a payload container showing first and second connective member storage elements.

As to certain embodiments, the aircraft controller (50) can provide a control panel (88) (as shown in the example of FIG. 9) which allows operators whether onboard the aircraft (1) or remote from the aircraft (1) (even from a plurality of discrete remote locations) to monitor and controllably configure each of the first lift body (2) and the second lift body (3) to operate the aircraft (1) of the aircraft (1). Instructions from the aircraft controller (50) to the first lift body controller (43) and the second lift body controller (44) can be by wired or wireless means. One example of an aircraft controller (50) suitable for use with embodiments of the invention can be an touch screen computer such as supplied by Vartech Systems, Baton Rouge, La., USA as model number VTPC150P.

As to particular embodiments, the one or more aircraft controller(s) can be in the form of a first aircraft controller (51) and a second aircraft controller (52) which can operate independently to correspondingly generate commands which drive the first parafoil controller (38) and the second parafoil controller (42) (or first lift body controller (42) and second lift body controller (43)) to continuously or intermittently controllably configure the first parafoil (31) and the second parafoil (32) (or the first lift body (2) and the second lift body (3)) based upon one or more sensed fluid flow characteristics (41) or one or more sensed lift body characteristics (49) to achieve a flight path for each of the first parafoil (31) and the second parafoil (32) (or the first lift body (2) and the second lift body (3)) which maintains each aloft at a correspondingly determined first altitude (17) and second altitude (18) to be acted upon by disparate fluid flow characteristics (8) sufficient to propel the aircraft (1) in a pre-selected flight path or to pre-selected destination coordinates.

As to other embodiments, the aircraft controller (50) can receive sensed one or more fluid flow characteristics (41) and sensed one or more lift body characteristics (49) and in response drives the first lift body controller (43) and the second lift body controller (43) to controllably configure the first lift body (2) and the second lift body (3) to propel the aircraft (1) in a pre-selected flight path between a first location (74) and a second location (75) or between pre-selected destination coordinates.

Now referring primarily to FIGS. 7A through 7G, which provide an exemplary embodiment of the inventive aircraft (1) including a first lift body (2) in the form of a first parafoil (30) controllably configurable to generate an amount of lift (19) sufficient to remain aloft at a first elevation (5) and a second lift body (3) in the form of a second parafoil (31) controllably configurable to generate an amount of lift (22) sufficient to remain aloft at a second elevation (6). The first elevation (5) in the form of a first altitude (17) and the second elevation (6) in the form of a second altitude (18) a sufficient distance apart (7) to subject the first lift body (2) to a first fluid flow (15) in the form of a first airflow (13) and the second lift body (3) to a second fluid flow (16) in the form of a second air flow (14). The first fluid flow (15) and the second fluid flow (16) having sufficiently disparate fluid flow characteristics (8) to propel the aircraft, as further described in detail below.

Again referring primarily to FIGS. 7A through 7G, a particular embodiment of the inventive aircraft (1) can include a first connective member (52) having a length disposed between a first end (53) and a second end (54). The first connective member (52) can be coupled by the first end (53) to the first lift body (2). The second connective member (55) having a length disposed between a first end (53) and a second end (54) can be coupled to by the first end (53) to the second lift body (3) The first connective member (52) and the second connective member (55) can be constructed from ultra-high-molecular-weight-polyethylene UHMWP strands, or the like. A suitable first connective member (52) and second connective member (55) can be a 0.25 inch 12-Strand Single-Braided DYNEEMA® cord available from Pelican Rope Works, Santa Ana, Calif., USA. The tensile strength of each of the first connective member (52) and the second connective member (55) being about 8,400 pounds. The first connective member (52) can have a length of about 16,000 feet and the second connective member (55) can have a length of about 2,000 feet.

Now referring primarily to FIG. 9, embodiments of the inventive aircraft (1) including, but not limited to the example of FIGS. 7A through 7G, can further include a first connective member storage (56) and a second connective member storage (57) which as shown in the example of FIGS. 7A through 7G couple to or reside in part or in whole inside a payload container (58). The first connective member (52) and said second connective member (55) can pay out correspondingly from the first connective member storage (56) and the second connective member storage (57) to establish the first lift body (2) at the first elevation (5) and said second lift body (3) at the second elevation (6) or to lengthen or shorten the first connective member (52) and the second connective member (55) to correspondingly adjust the first elevation (5) or the second elevation (6).

As one example of a suitable first connective member storage (56), the first connective member (52) can be wound on a first reel (59) and payed out by a first winch (60) such as Model Number JJ-5-B available from Changshu Andes Electric Power Tools Manufacturing Co., Ltd., Suzhou, Jiangsu, China. The first winch (60) can for example incorporate a 13 horsepower engine having variable speed which can achieve a pulling force in the range of about 1,800 pounds (816.2 kilograms) at a speed of 79 feet per minute (24.1 meters per minute) and about 10,000 pounds at a speed of 13 feet per minute (4.0 meters per minute). The first winch (60) can further include a power-take-off pulley (61) to drive a direct current generator (62). A generator (62) suitable for use with embodiments of the invention is Model Number 300W-DC 12V-24V available from Alternative Sustainable Energy LLC, Phoenix, Ariz., USA. The power from the 300W-DC 12V-24V generator can power a first electric motor (63) to drive the first reel (59) to wind and unwind the first connective member (52) as payed out and in by the first winch (60). Similarly, the second connective member (55) can be wound on a second reel (64) by a second electric motor (65) and payed out by a second winch (66), as above described for the first connective member (52).

An exemplary embodiment of the first reel (59) includes a pair of discs (67) (reel shown in cross section) disposed in substantially parallel opposed relation each having a diameter of about 30 inches and held a distance apart of about 22 inches by a central drum (68) which defines an axis (70) about which the first reel (59) rotates. The first reel (59) can be caused to rotate bidirectionally as required to maintain tension on the first connective member (52) as it is wound onto or off of the first reel (59). The bidirectional rotation of the first reel (59) can be powered by the first electric motor (63). An example of a first electric motor (63) suitable for use with embodiments of the invention is a geared electric motor Model Number 1Z826 available from Dayton Electric Motors, Burton, Mich., USA. The first connective member (52) can be orderly laid upon the first reel (59) through the use of a bidirectional linear actuator (69). The bidirectional linear actuator (69) may be of the type supplied by Firgelli Automations, Inc., Surrey, British Columbia, Canada as Model Number FA-05-12-24.

An exemplary embodiment of the second reel (64) includes a pair of discs (71) disposed in substantially parallel opposed relation each having a diameter of about diameter of 13.5 inches and held a distance apart of about 22 inches by a central drum (72) which defines an axis (72) about which the second reel (64) rotates. The second reel (64) can rotate bidirectionally as required to maintain tension on the second connective member (55) as it is wound onto or off of the second reel (64). The bidirectional rotation of the second reel (64) can be powered by a second electric motor (65), as above described for the first reel (59). The second connective member (55) can be orderly laid upon the second reel (64) through the use of a bidirectional linear actuator (69), as above described.

Again referring primarily to FIGS. 7A through 7G and FIG. 9, the payload container (58) can be of open or closed configuration and can provide sufficient space for crew members for crewed operation of the aircraft (1); although the example of FIGS. 7A through 7G affords an inventive aircraft (1) remotely piloted from a support surface (84). While the support surface (84) shown in the example of FIGS. 7A through 7G is the Earth's surface, the support surface (84) can be any sufficiently supportive surface, such as: the deck of a boat, the floor of an aircraft, a paved surface, an elevated pad, or the like. The weight of the inventive aircraft (1) shown in the example of FIGS. 7A through 7G and as described above including all components without crew members can be about 2,240 pounds; however, the elements of the inventive aircraft (1) can be scaled to afford a substantially greater or lesser dimensional relations and weight depending upon the application.

Embodiments of the inventive aircraft (1), including the particular example of FIGS. 7A through 7G, can be configured to operate with the first fluid flow (15) and the second fluid flow (16) having disparate fluid flow characteristics (8) in the form of a difference in actual air flow speeds of slightly greater than zero miles per hour, less than 10 miles an hour, between slightly greater than zero miles per hour and about 55 miles per hour, between slightly greater than zero miles per hour and 200 miles per hour, or even a actual air flow speeds having a difference of greater than 200 miles per hour, or where the disparate air flow speed is selected from the group including or consisting of: 0.1 miles per hour to about 1 mile per hour, about 5 miles per hour and about 15 miles per hour, about 10 miles per hour and about 20 miles per hour, about 15 miles per hour and about 25 miles per hour, about 20 miles per hour and about 30 miles per hour, about 25 miles per hour and about 35 miles per hour, about 30 miles per hour and about 40 miles per hour, about 35 miles per hour and about 45 miles per hour, about 40 miles per hour and about 50 miles per hour, about 45 miles per hour and about 55 miles per hour, about 50 miles per hour and about 60 miles per hour, about 55 miles per hour and about 65 miles per hour, about 60 miles per hour and about 70 miles per hour, about 65 miles per hour and about 75 miles per hour, about 70 miles per hour and about 80 miles per hour, about 75 miles per hour and about 85 miles per hour, about 80 miles per hour and about 90 miles per hour, about 850 miles per hour and about 95 miles per hour, about 90 miles per hour and about 100 miles per hour, about 95 miles per hour and about 105 miles per hour, about 100 miles per hour and about 110 miles per hour, about 105 miles per hour and about 115 miles per hour, about 110 miles per hour and about 120 miles per hour, about 115 miles per hour and about 125 miles per hour, about 120 miles per hour and about 130 miles per hour, about 125 miles per hour and about 135 miles per hour, about 130 miles per hour and about 140 miles per hour, about 135 miles per hour and about 145 miles per hour, about 140 miles per hour and about 150 miles per hour, about 145 miles per hour and about 155 miles per hour, about 150 miles per hour and about 160 miles per hour, about 155 miles per hour and about 165 miles per hour, about 160 miles per hour and about 170 miles per hour, about 165 miles per hour and about 175 miles per hour, about 170 miles per hour and about 180 miles per hour, about 175 miles per hour and about 185 miles per hour, about 180 miles per hour and about 190 miles per hour, about 185 miles per hour and about 195 miles per hour, about 190 miles per hour and about 200 miles per hour.

Figure 7A:
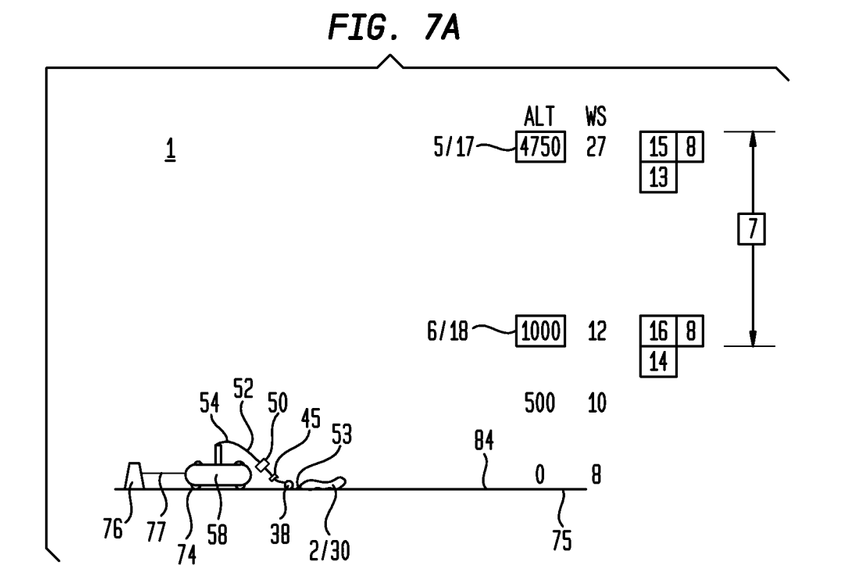
FIGS. 7A through 7G illustrate a particular stepwise method of flying a particular embodiment of the inventive aircraft.

Now referring primarily to FIG. 7A, to facilitate the planning of the independent flight paths of the first lift body (2) (first parafoil (30)) and the second lift body (3) (second parafoil (31)) in a first fluid flow (15) (first air flow (13)) and a second fluid flow (16) (second air flow (14)) having disparate fluid flow characteristics (8) in the form of a difference in airspeed of as above described and to plan the flight path of the inventive aircraft (1) between a first location (74) and a second location (75), forecasts provided by the National Oceanic and Atmospheric Administration NOAA (Real-time Environmental Applications and Display System), or other source, can be initially and continuously or intermittently modeled by the first aircraft controller (50) (or a first and a second aircraft controller (51)) to project the speed and the direction of the first fluid flow (15) and the second fluid flow (16) at elevations or altitudes from the Earth's surface and up to an elevation of about 76,000 feet.

As above described with respect to FIG. 1, a first elevation (5) and a second elevation (6) having an altitude difference of 7,000 feet (2133.6 meters) can provide a first fluid flow (15) and a second fluid flow (16) having a difference in wind speed of about 28 mph (12.52 meters per second). Embodiments of the inventive aircraft (1) can be configured with a first connective member (52) having a length disposed between a first end (53) and a second end (54) of about 16,000 feet (4,876.8 meters). Accounting for the sag between the first end (53) and the second end (54) during normal operation of the inventive aircraft (1) a first connective member (52) having a length of 16,000 feet (4,876.8 meters) will permit the first lift body (2) (first parafoil (30) in the example of FIGS. 7A through 7C) to remain aloft in a first air flow (13) at a distance apart (7) of about 7,000 feet (2133.6 meters) (or difference in elevation between the first lift body (2) and the second lift body (3) of up to about 7,000 feet).

As shown in FIG. 7A, the payload container (58) can be located at a first location (74) on the support surface (84). The payload container (58) can be anchored to an anchor point (76) by an anchor line (77) to maintain the payload container (58) at the first location (74). In preparation for launch, the first lift body (2) can be deployed on the support surface (84) downwind of the payload container (58). The first lift body (2) can be configured as above described and connected to the payload container (58) by the first connective member (52).

Figure 7B:
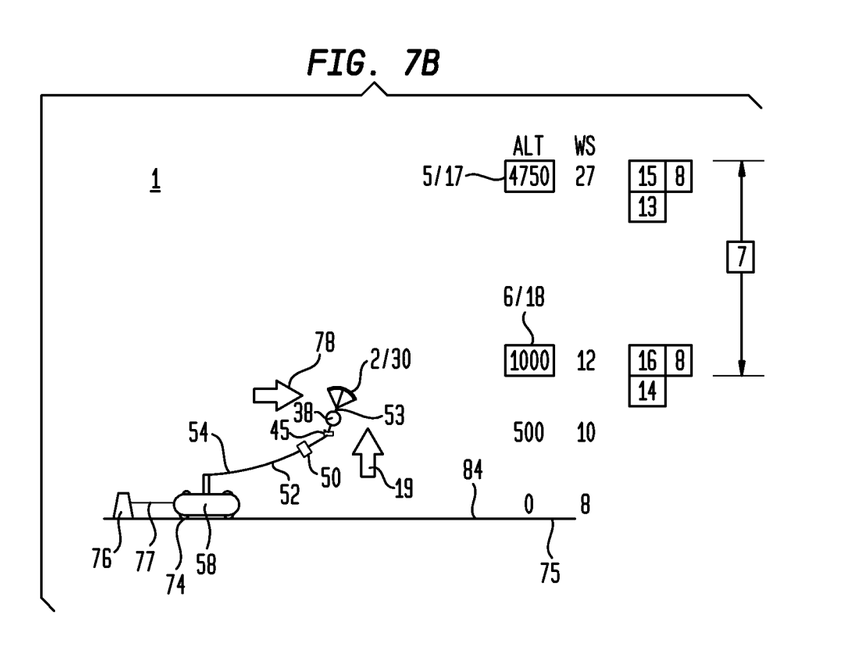

Now referring to FIG. 7B, the first lift body (2) (being a first parafoil (30) in the examples of 7A through 7G) can become airbone subject to a first airflow speed (78) of about 8 miles per hour. The first lift body (2) controllably configured by the first lift body controller (44) (first parafoil controller (38) in the examples of FIGS. 7A through 7G) to become airborne in a first air flow speed (78) of 7.5 mph begins to ascend. The first parafoil controller (38) continuously or intermittently configures the first lift body (2) to facilitate ascent of the first lift body (2) toward the first elevation (5) as determined or instructed by the first parafoil controller (38) which in the example of FIGS. 7C and 7D positions the first lift body (2) at first elevation (5) of about 4,750 feet (as shown in the example of FIG. 7C).

Figure 7C:
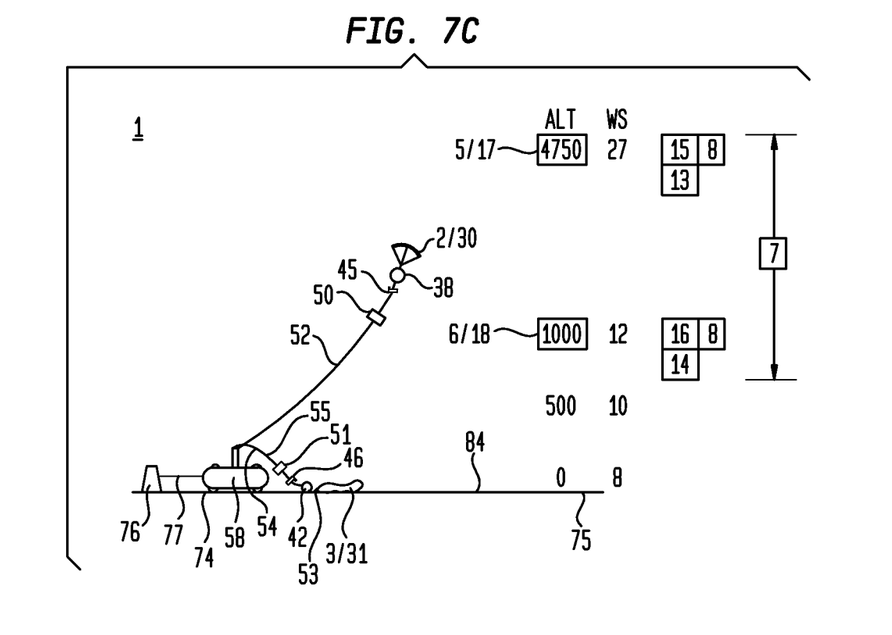

Now referring to FIG. 7C, the first lift body (2) continues to ascend toward the first elevation (5) of about 4,750 feet. The first parafoil controller (38) can then configure the first lift body (2) to continue to ascend while also ensuring that the lift (19) of the first lift body (2) remains insufficient to raise the payload container (58) off of the support surface (84). In preparation for launch, the second lift body (3) can be laid on the support surface (84) downwind of the payload container (58). The second lift body (3) can be attached to the payload container (58) by the second connective member (55).

Figure 7D:
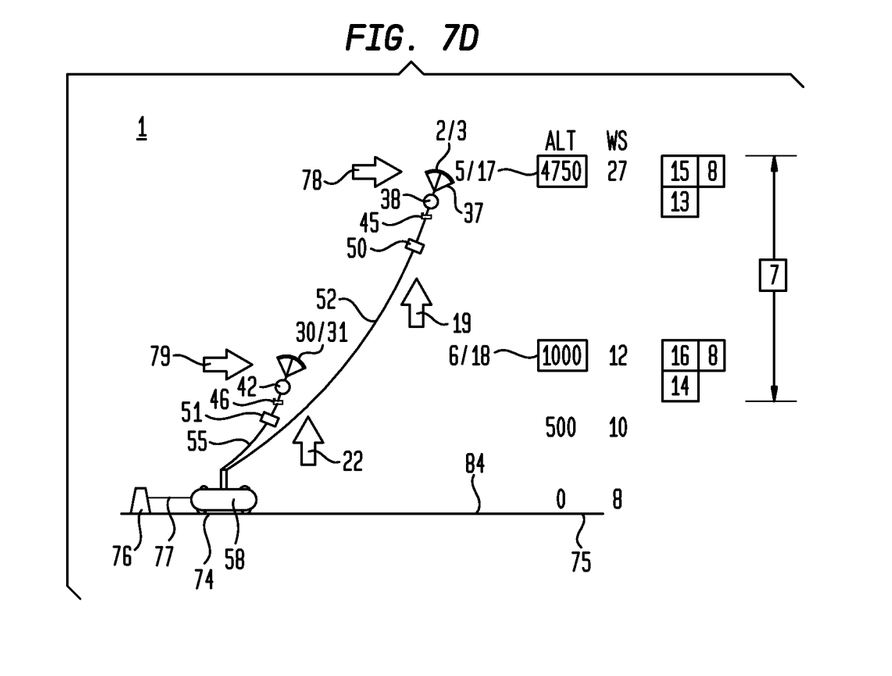

Now referring primarily to FIG. 7D, which shows that the first lift body (2) has reached a first elevation (5) (or first altitude (17)) of 4,750 feet. The first lift body (2) being subjected to a first fluid flow (15) (a first airflow (13)) at the first elevation (5) having a first airflow speed (78) of about 27 miles per hour. While the first lift body (2) ascends toward the first elevation (or altitude) of 4,750 feet, the second lift body (3) can be launched. The second airflow speed (79) at the support surface (84) in the example of FIG. 7D is 8 mph. The second lift body (3) can have a configuration or be controllably configured to become airborne at an airflow speed of about 7.5 miles per hour.

The second lift body (3) can be maneuvered during the ascent toward the second elevation (6) to avoid the first connective member (52) coupled between the first lift body (2) and the payload container (58) by operation of the second parafoil controller (42). As shown in the example of FIG. 7D, the second lift body (3) can be controllably configured to generate sufficient lift (22) to achieve and remain aloft at a second elevation (6) (or second altitude (18)) which for the instant example is initially 1,000 feet. The second lift body (3) at the second elevation (6) can be subjected to a second fluid flow (16) (or second airflow (14)) having a second air flow speed (79) of about 12 miles per hour. The first lift body (2) and the second lift body (3) can be controllably configured through the corresponding use of the first lift body controller (43) and the second lift body controller (44) such that the combined lift (19)(22) of the first lift body (2) and the second lift body (3) remains insufficient to raise the payload container (58) from the support surface (73).

Figure 7E:
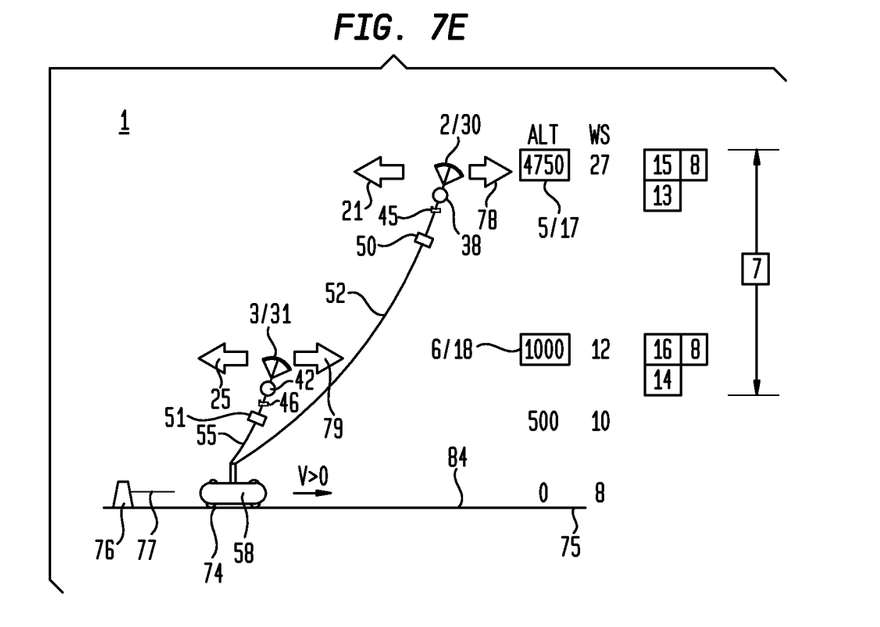

Now referring primarily to FIG. 7E, the payload container (58) can be released from the anchor point (76). The first lift body (2) can be controllably configured through the use of the first parafoil controller (38) to increase the amount of drag (21) conveyed to the payload container (58). The amount of drag (21) conveyed to the payload container (58) can be sufficient to cause the payload container (58) to accelerate. As the payload container (58) accelerates, the difference between the first airflow speed (78) and the second airflow speed (79) and speed of first lift body (2) and the second lift body (3) diminishes. In an additional step, the second lift body (3) can be controllably configured through the use of the second parafoil controller (42) to descend to a second elevation (6) of about 500 feet while turning about 180 degrees.

Figure 7F:
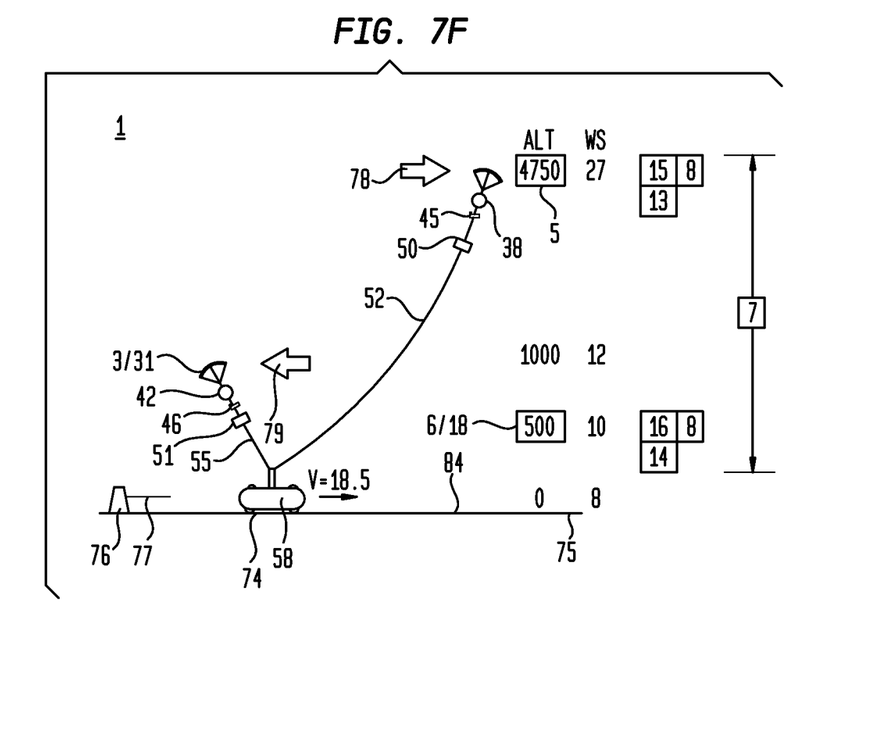

Now referring primarily to FIG. 7F, which shows that the second lift body (3) has executed a turn of about 180 degrees. During the turning and descending maneuver, the second lift body (3) has descended to a second elevation (6) of about 500 feet. The slack in the second connective member (55) can be taken up by operation of the second connective member storage (57). The second fluid flow (16) at the second elevation (6) of about 500 feet can be about 10 mph. The first lift body (2) and second lift body (3) are correspondingly subjected to a first fluid flow (15) having air flow speed of 27 miles per hour and a second fluid flow (16) having an air flow speed of 10 miles per hour. The first and second airflow speeds (78)(79) have disparate fluid flow characteristics (8) (27 miles per hour minus 10 miles per hour=a difference of 17 miles per hour). This disparity between the first and second air flow speeds (78)(80) subjects the first lift body (2) to a first relative airflow speed (81) of 8.5 miles per hour and the second lift body (3) to a second relative airflow speed (82) of 8.5 miles per hour in the opposite direction to that of the first lift body (2). This can propel the payload container (58) relative to the support surface (73) of about 18.5 miles per hour.

Figure 7G:
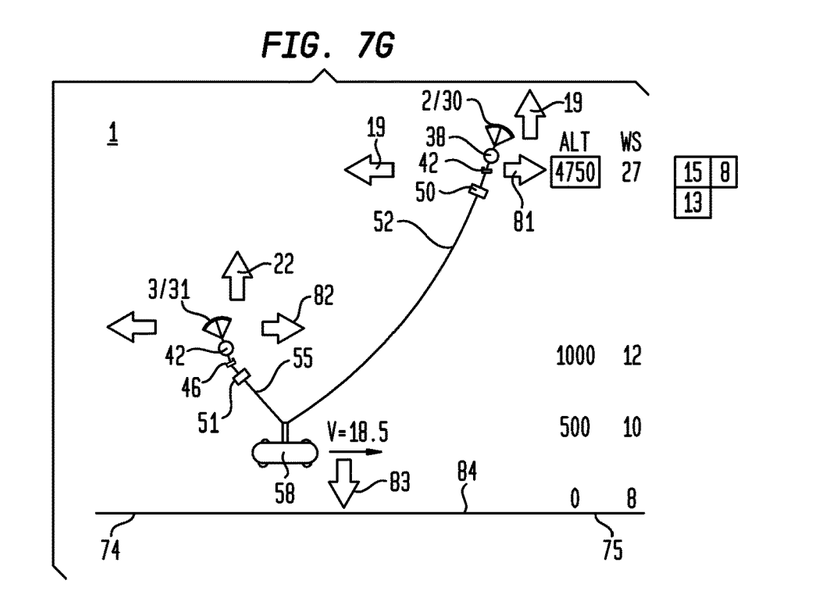

Now referring primarily to FIG. 7G, which shows that each of the first lift body (2) and the second lift body (3) is subjected to a first relative air flow speed (81) and a second relative air flow speed (82) of 7.5 miles per hour or greater. The first lift body (2) and the second lift body (3) can be controllably configured by operation of the corresponding first lift body controller (43) and second lift body controller (44) to generate a combined amount of lift (19)(22) which overcomes an amount of weight (Wpayload) (83) of the payload container (58). As a result, the payload container (58) can begin to ascend. At this point in the process, the aircraft (1) can be navigated by altering the magnitude and direction of the amount of drag (21)(25) and the amount of lift (19)(22) generated separately and in combination by the first lift body (2) and the second lift body (3) of the aircraft (1). The inventive aircraft (1) can be returned to the support surface (84) at a pre-determined second location (75) by controllably configuring the first lift body (2) and the second lift body (3) to sufficiently change the combined lift (19) (22), thereby allowing the payload container (58) to descend to the support surface (84) at the pre-determined second location (75).

As can be easily understood from the foregoing, the basic concepts of the present invention may be embodied in a variety of ways. The invention involves numerous and varied embodiments of an aircraft propelled by disparate fluid flows and methods of propelling an aircraft using disparate fluid flows including the best mode.

As such, the particular embodiments or elements of the invention disclosed by the description or shown in the figures or tables accompanying this application are not intended provide examples of the numerous and varied embodiments generically encompassed by the invention or equivalents encompassed with respect to any particular element thereof. In addition, the specific description of a single embodiment or element of the invention may not explicitly describe all embodiments or elements possible; many alternatives are implicitly disclosed by the description and figures.

It should be understood that each element of an apparatus or each step of a method may be described by an apparatus term or method term. Such terms can be substituted where desired to make explicit the implicitly broad coverage to which this invention is entitled. As but one example, it should be understood that all steps of a method may be disclosed as an action, a means for taking that action, or as an element which causes that action. Similarly, each element of an apparatus may be disclosed as the physical element or the action which that physical element facilitates. As but one example, the disclosure of "a sensor" should be understood to encompass disclosure of the act of "sensing"—whether explicitly discussed or not—and, conversely, were there effectively disclosure of the act of "sensing", such a disclosure should be understood to encompass disclosure of "a sensor" and even a "means for sensing." Such alternative terms for each element or step are to be understood to be explicitly included in the description.

In addition, as to each term used it should be understood that unless its utilization in this application is inconsistent with such interpretation, common dictionary definitions should be understood to included in the description for each term as contained in the Random House Webster's Unabridged Dictionary, second edition, each definition hereby incorporated by reference.

All numeric values herein are assumed to be modified by the term "about", whether or not explicitly indicated. For the purposes of the present invention, ranges may be expressed as from "about" one particular value to "about" another particular value. When such a range is expressed, another embodiment includes from the one particular value to the other particular value. The recitation of numerical ranges by endpoints includes all the numeric values subsumed within that range. A numerical range of one to five includes for example the numeric values 1, 1.5, 2, 2.75, 3, 3.80, 4, 5, and so forth. It will be further understood that the endpoints of each of the ranges are significant both in relation to the other endpoint, and independently of the other endpoint. When a value is expressed as an approximation by use of the antecedent "about," it will be understood that the particular value forms another embodiment.

Thus the applicant(s) should be understood to claim at least: i) an aircraft and air craft lift and propulsion as herein disclosed and described, ii) the related methods disclosed and described, iii) similar, equivalent, and even implicit variations of each of these devices and methods, iv) those alternative embodiments which accomplish each of the functions shown, disclosed, or described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) methods and apparatuses substantially as described hereinbefore and with reference to any of the accompanying examples, x) the various combinations and permutations of each of the previous elements disclosed.

The background section of this patent application provides a statement of the field of endeavor to which the invention pertains. This section may also incorporate or contain paraphrasing of certain United States patents, foreign patents, patent applications, publications, or subject matter of the claimed invention useful in relating information, problems, or concerns about the state of technology to which the invention is drawn toward. It is not intended that any United States patent, patent application, publication, statement or other information cited or incorporated herein be interpreted, construed or deemed to be admitted as prior art with respect to the invention.

The claims set forth in this international PCT patent specification are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent application or continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

The claims set forth in this specification, if any, are further intended to describe the metes and bounds of a limited number of the preferred embodiments of the invention and are not to be construed as the broadest embodiment of the invention or a complete listing of embodiments of the invention that may be claimed. The applicant does not waive any right to develop further claims based upon the description set forth above as a part of any continuation, division, or continuation-in-part, or similar application.

I claim:

1. An aircraft, comprising:
a first lift body controllably configurable to generate a lift sufficient to remain aloft at a first elevation;
a first lift body sensor which senses said fluid flow characteristics proximate said first lift body;
a first lift body controller which controllably configures said first lift body to alter said amount of lift or alter said amount of drag;
a second lift body controllably configurable to generate a lift sufficient to remain aloft at a second elevation, said first elevation and said second elevation having a difference in altitude, said difference in altitude subjects said first lift body to a first fluid flow and said second lift body to a second fluid flow, said first fluid flow and said second fluid flow having sufficiently disparate fluid flow characteristics, said disparate fluid flow characteristics propel said aircraft;
a second lift body sensor which senses said fluid flow characteristics proximate said second lift body;
a second lift body controller which controllably configures said second lift body to alter said amount of lift or alter said amount of drag;
a first connective member having a length disposed between a first end and a second end, said first end coupled to said first lift body;
a second connective member having a length disposed between a first end and a second end, said first end coupled to said second lift body;
a payload container, said second end of said first connective member and said second connective member coupled to said payload container; and
an aircraft controller which receives a first signal from said first lift body sensor and a second signal from said second lift body sensor, said first signal and said second signal varying based on change in said fluid flow characteristics of said first fluid flow and said second fluid flow, said aircraft controller analyzing said first signal and said second signal to compensate for an amount of weight of said aircraft including said payload container and said payload to generate commands which drive said first lift body controller and said second lift body controller to controllably configure said first lift body and said second lift body to variably generate lift to propel said weight of aircraft in a flight path between pre-selected destination coordinates.

2. The aircraft of claim 1, wherein said first lift body and said second lift body comprise an unpowered first lift body and an unpowered second lift body.

3. The aircraft of claim 2, wherein said first fluid flow and said second fluid flow comprise a first air flow and a second air flow and wherein said disparate fluid flow characteristics are selected from the group consisting of: disparate air flow speed, disparate air flow direction, and combinations thereof.

4. The aircraft of claim 2, wherein each of said first lift body and said second lift body controllably configurable to alter one or more of said lift or drag.

5. The aircraft of claim 4, wherein each of said first lift body and said second lift body controllably configurable to alter pitch, yaw, roll and combinations thereof.

6. The aircraft of claim 2, wherein said length of each of said first connective member and said second connective member adjustable to locate said first lift body at said first elevation and to locate said second lift body at said second elevation.

7. The aircraft of claim 6, wherein each of said second end of said first connective member and said second end of said second connective member have an adjustable location in relation to said payload container.

8. The aircraft of claim 7, further comprising a first connective member storage and a second connective member storage disposed in said payload container, said first connective member and said second connective member paying out correspondingly from said first connective member storage and said second connective member storage to establish said first lift body at said first elevation and said second lift body at said second elevation.

9. The aircraft of claim 2, wherein said disparate air flow speed between said first elevation and said second elevation is less than 30 miles per hour.

10. The aircraft of claim 2, wherein said disparate air flow speed between said first elevation and said second elevation is between about 0.1 miles per hour and 30 miles per hour.

11. The aircraft of claim 2, wherein said disparate air flow speed between said first elevation and said second elevation is selected from one or more of the group consisting of: 0.1 miles per hour to about 1 mile per hour, about 5 miles per hour and about15 miles per hour, about 10 miles per hour and about 20 miles per hour, about 15 miles per hour and about 25 miles per hour, about 20 miles per hour and about 30 miles per hour, about 25 miles per hour and about 35 miles per hour, about 30 miles per hour and about 40 miles per hour, about 35 miles per hour and about 45 miles per hour, about 40 miles per hour and about 50 miles per hour, about 45 miles per hour and about 55 miles per hour, about 50 miles per hour and about 60 miles per hour, about 55 miles per hour and about 65 miles per hour, about 60 miles per hour and about 70 miles per hour, about 65 miles per hour and about 75 miles per hour, about 70 miles per hour and about 80 miles per hour, about 75 miles per hour and about 85 miles per hour, about 80 miles per hour and about 90 miles per hour, about 850 miles per hour and about 95 miles per hour, about 90 miles per hour and about 100 miles per hour, about 95 miles per hour and about 105 miles per hour, about 100 miles per hour and about 110 miles per hour, about 105 miles per hour and about 115 miles per hour, about 110 miles per hour and about 120 miles per hour, about 115 miles per hour and about 125 miles per hour, about 120 miles per hour and about 130 miles per hour, about 125 miles per hour and about 135 miles per hour, about 130 miles per hour and about 140 miles per hour, about 135 miles per hour and about 145 miles per hour, about 140 miles per hour and about 150 miles per hour, about 145 miles per hour and about 155 miles per hour, about 150 miles per hour and about 160 miles per hour, about 155 miles per hour and about 165 miles per hour, about 160 miles per hour and about 170 miles per hour, about 165 miles per hour and about 175 miles per hour, about 170 miles per hour and about 180 miles per hour, about 175 miles per hour and about 185 miles per hour, about 180 miles per hour and about 190 miles per hour, about 185 miles per hour and about 195 miles per hour, about 190 miles per hour and about 200 miles per hour.

* * * * *